SELECTIVE ELECTRICAL DIALING SYSTEM

Filed Dec. 21, 1951 2 Sheets-Sheet 1

INVENTOR
Pedro Salinas Máynez,
BY Bernard F. Garvey
ATTORNEY

Dec. 18, 1956 P. S. MAYNEZ 2,774,823

SELECTIVE ELECTRICAL DIALING SYSTEM

Filed Dec. 21, 1951 2 Sheets-Sheet 2

INVENTOR

Pedro Salinas Máynez,

BY Bernard J. Garvey

ATTORNEY

United States Patent Office 2,774,823

Patented Dec. 18, 1956

2,774,823

SELECTIVE ELECTRICAL DIALING SYSTEM

Pedro Salinas Maynez, Mexico City, Mexico

Application December 21, 1951, Serial No. 262,692

7 Claims. (Cl. 179—90)

My invention relates broadly to automatic telephone systems and more particularly to an improved dialing system for automatic telephones.

One of the objects of my invention is to provide an improved dialing system for automatic telephones having a minimum number of parts and capable of reliable operation with minimum maintenance, repair, or adjustment problems.

Another object of my invention is to provide an improved dialing system for automatic telephones which is interchangeable with existing standard types of dialing systems now in general use throughout Mexico, the United States and elsewhere.

A further object of my invention is to provide an improved dialing system which is convenient for the use of telephone subscribers by reason of the fact that the dialing mechanism revolves in but one direction, without the necessity of recoil time, or reverse movement of the dial for thus saving fifty percent or more of the time necessary to dial a telephone number.

A still further object of my invention is to provide an improved dialing system for automatic telephone circuits in which fifty percent or more of the power normally consumed in the conventional dialing system is saved to the utility company as the system of my invention utilizes less than fifty percent of the normal power consumed in completing the average automatic telephone circuit.

Still another object of my invention is to provide an improved one-way rotative dialing system for telephone circuits for coaction with a central switch board system in such manner as to conserve the time utilized for completing automatic circuits at the central switch board for thereby increasing the availability of line facilities with the accompanying increase in revenue to the utility company.

Still another object of my invention is to provide an improved dialing system for unidirectional operation capable of successive contact control for controlling the transmission of pulses over the telephone line, at a rate of speed limited only by the speed of operation of the central switch board.

A still further object of my invention is to provide an improved automatic dialing system of unidirectional rotative characteristics having adequate facilities for intercity dialing by adding effective dialing positions in addition to the facilities for controlling the operation of local telephone circuits.

Figure 1:
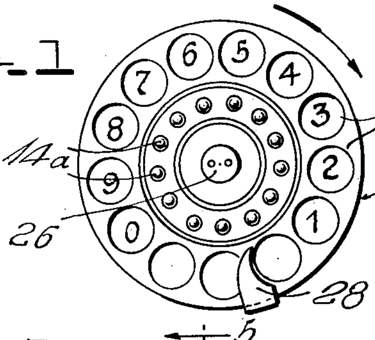
Figure 2:
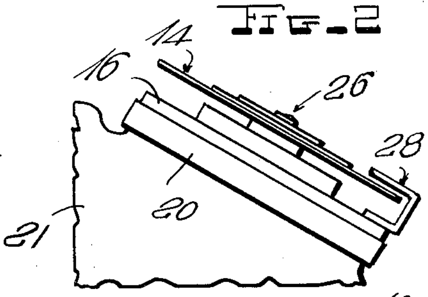
Figures 3, 4, 5, 6, 13:
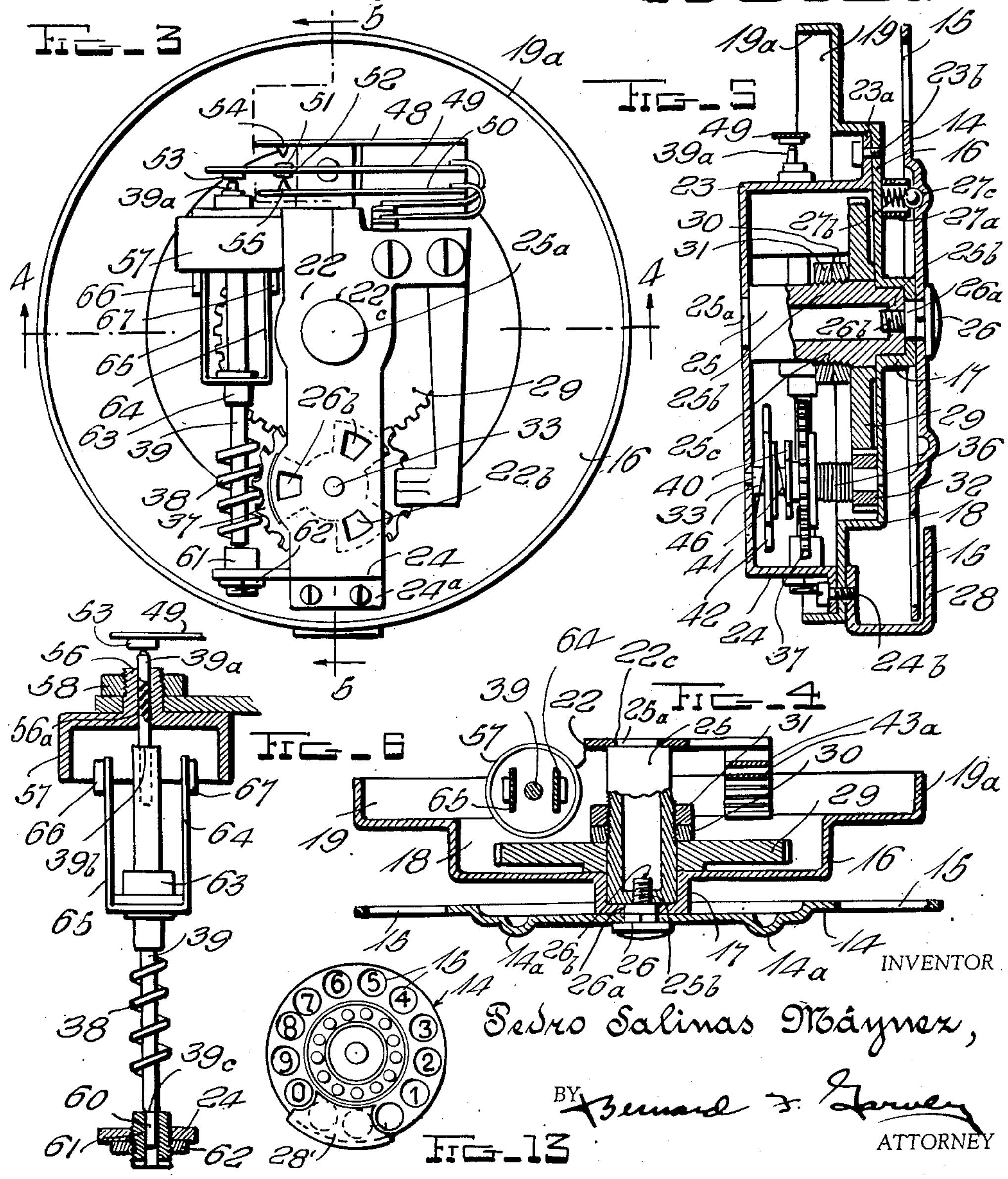
Figure 7:
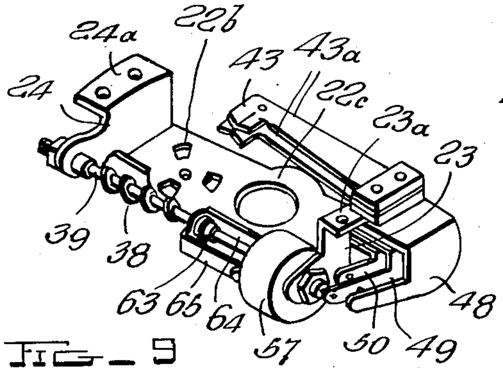
Figure 8:
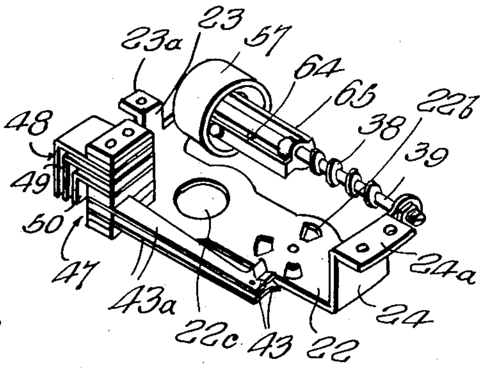
Figure 9:
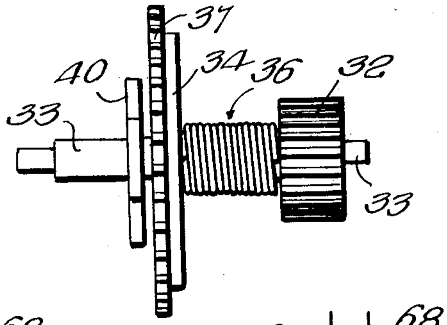
Figure 10:
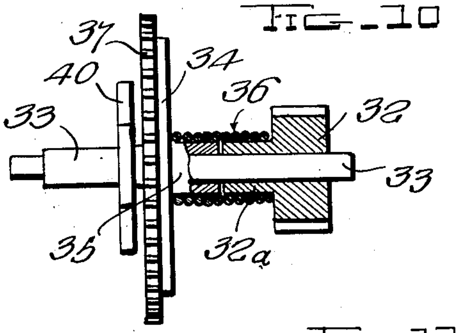
Figures 11, 12, 14:
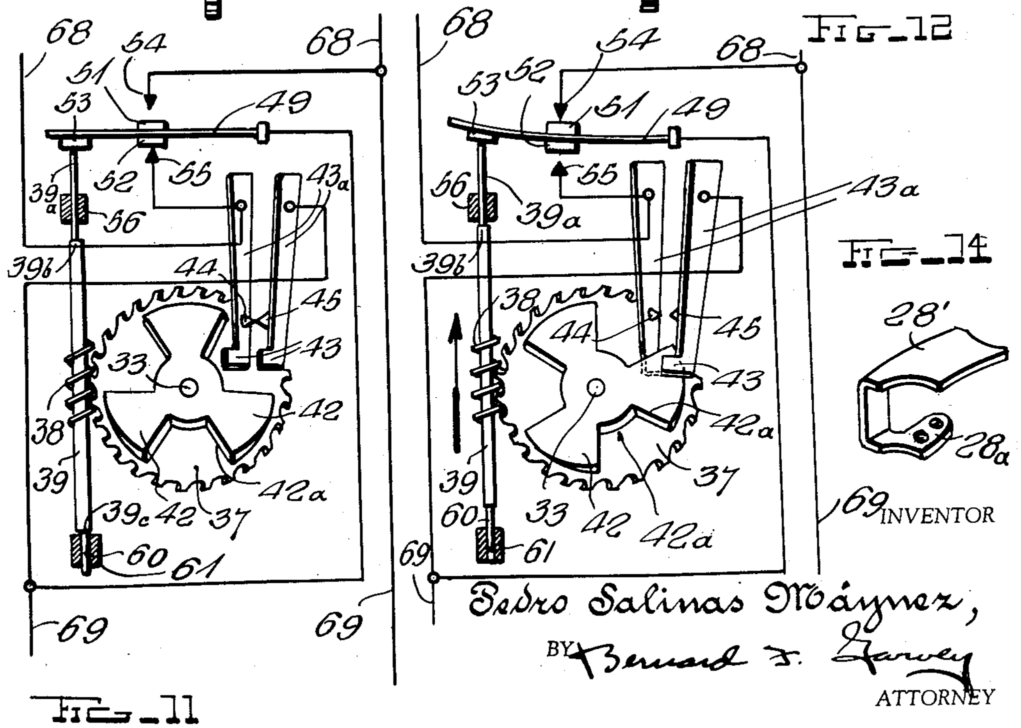

Other and further objects of my invention reside in the arrangement of unidirectional successive dialing system as set forth more fully in the specification hereinafter following by reference to the accompanying drawings, in which:

Figure 1 is a front elevational view showing the arrangement of unidirectionally rotatable selector dial embodying my invention; Fig. 2 is a side elevational view showing the selector dial of my invention installed in position on a conventional disc type telephone stand; Fig. 3 is a plan view looking beneath the telephone dial; Fig. 4 is a transverse sectional view taken substantially on line 4—4 of Fig. 3; Fig. 5 is a sectional view taken substantially on line 5—5 of Fig. 3 with certain of the parts illustrated in elevation; Fig. 6 is an enlarged elevational view of the inertia device and the main operating shaft in the mechanism of my invention and showing particularly the mounting of the shaft for translatory movement and for composite rotative movement; Fig. 7 is a perspective view of the composite translatory and rotative mechanism employed in the structure of my invention, looking at the contact control end of the mechanism; Fig. 8 is a view similar to the view shown in Fig. 7, but reversed end-to-end and showing more particularly the mounting of the translatory and rotatable inertia device; Fig. 9 is a detail elevational view showing the unilateral motion transmitting gearing used in the mechanism of my invention; Fig. 10 is a view similar to the view shown in Fig. 9, but showing certain of the parts broken away and illustrated in section for more clearly showing the unilateral torsion coupling used in the mechanism of Fig. 9; Fig. 11 is a theoretical view illustrating the principle of operation of the mechanism of my invention, the view showing the circuit condition when the dial mechanism is at rest; Fig. 12 is a view similar to the view shown in Fig. 11, but illustrating the condition when the dial is unidirectionally turned for selecting various permutations and combinations of impulses for transmission to the central station; Fig. 13 is a front elevational view of a modified form of dial mechanism embodying my invention showing particularly a modified construction of stop device which may be applied to the telephone dial for closing adjacent finger positions on the dial which may not be required for use at a particular subscriber position; and Fig. 14 is a perspective view of the modified form of stop and finger position closer shown in Fig. 13.

My invention is directed to an improved dialing system for automatic telephones which I have developed for saving the time of subscribers as well as line time and switch board utilization time for the utility company. My system eliminates needless time on the part of telephone subscribers, the time normally occupied by the transmission of control pulses over the telephone line to the central station and the switch board operating time by entirely discarding the reverse movement operation of the conventional telephone dial. The system of my invention operates wholly upon the unidirectional movement of the subscriber's dial without a dial restoring operation. The time necessary for the return of the conventional dial to the initial dialing position is wholly eliminated with all the inherent saving of the subscriber's time, line time, and without the consumption of switch board operating time.

The dial in the system of my invention operates clockwise at all times and does not reverse its direction. The digits or letters selected are dialed by movement of the individual movable dial in a clockwise direction. The impulse selection representing each digit or letter is completed as each successive unidirectional movement of the dial is completed, whereupon the dial is immediately available for a further successive movement from the position of rest thereof for the next successive number or digit, to the stop position. In securing these advantages I decrease the number of component elements in the telephone dial structure below conventional dial structures, saving many of the component elements normally required. The saving of parts in the dialing system of my invention not only reduces cost in the manufacture of the device but simplifies maintenance and repair and correspondingly reduces such maintenance overhead. The improved dial system of my invention makes use of a linearly displaceable shaft element which is positively driven to a displaced position under the action of each dialing operation. The displacement of the shaft element conditions the circuit to the telephone exchange by providing a closed signal path which is immediately thereafter selectively impulsed according to the digit or letter which is dialed. The succeeding numbers or digits are dialed by selectively moving the dial from the selecting position to the stop position whereby the line circuit to the telephone exchange is initially conditioned and then immediately pulsed by the successive opening and closing of contacts controlled by the movement of the dial from a selected number or digit position on the dial, the said movement being successively unidirectional without a restoring operation. I employ in the system of my invention a unilateral torsion coupling of the rotatable elements whereby reverse movement of the parts is prevented. The parts can turn in only one direction and any tendency to rotate in the reverse direction is resisted by the unilateral torsion coupling system which I build into the operating mechanism of my invention.

Referring to the drawings, in more detail, reference character 14 designates a telephone dial carrying circular finger-cutouts 15 allowing selection on the dial for ten figure or letter positions and two additional figure positions which I may utilize for extension of the dialing facility such as inter-city operation or for additional letters.

The dial is rotatably mounted for operation unidirectionally in a clockwise direction, represented by the arrow. The dial 14 is mounted with respect to a top casing 16 as shown more clearly in Figs. 4 and 5. The top casing 16 substantially conforms with the shape of the dial 14 and is provided with a recessed central portion 17 and a transversely extending recessed portion 18 contiguous with a further transverse recessed portion 19 which terminates in an annular skirt *19a*. The skirt *19a* of the top casing 16 fits over the cylindrical side wall of the lower casing 20 which is mounted on the telephone stand 21 in the conventional inclined position immediately below the transmitter and receiver support. The transverse recess 18 provides a mounting means for a bracket 22 which is provided with spacing feet at opposite ends thereof, represented at 23 and 24 which terminate in attachment means *23a* and *24a* through which the screws *23b* and *24b* extend for fastening bracket 22 in a substantially diametrical position along a vertical axis beneath the top casing 16. The bracket 22 is apertured as represented at *22c* to provide a bearing for the stepped end *25a* of the tubular unidirectionally rotatable shaft 25. The other end of the tubular unidirectionally rotatable shaft 25 is fastened to the dial 14 by means of screw member 26. The screw member 26 has a central shoulder *26a* formed thereon and an externally screw threaded terminus *26b* which enters the internally screw threaded end *25b* of the tubular unidirectionally rotatable shaft 25. The shoulder *26a* of screw 26 passes through a central aperture in dial 14 and through an aligned aperture in the end of the recessed central portion 17 of the top casing 16. The shoulder *26a* predetermines the spatial relation between the undersurface of the head of screw 26 and the end of the recessed central portion 17 of the top casing 16 so that dial 14 is free to revolve with respect to the top casing 16 keyed to the tubular unidirectionally rotatable shaft 25 through the screw threaded terminus *26b*. The dial 14 may be controlled in step-by-step unidirectionally rotative movement in a variety of ways. In Figs. 4 and 5 I have shown an arrangement of spring pressed detent 27 carried by top casing 16 constituted by a cylinder *27a* and an internally arranged compressive spring *27b* and coacting spring pressed ball *27c* which is yieldably urged into latching connection with a circular row of recesses in dial 14 represented at *14a*. The recesses *14a* correspond in number to the number of finger-cutout positions in dial 14 and serve to latch dial 14 in the selected position to which it is moved to the remote stop position limited by the stop member 28. Stop member 28 is secured to the upper angular face of the recessed portion 19 of the top casing 16 by means of the same screws *24b* which secure the attachment means *24a* of foot member 22.

The top annular face of the recessed portion 19 of the top casing carries the ordinals and/or letters in the positions I have represented at 1, 2, 3, 4, 5, 6, 7, 8, 9 and 0 with which the finger-cutouts of the unidirectionally rotatable dial 14 are normally registered. The arrangement as shown in Figs. 1 and 13 leaves three of the finger-cutouts 15 in positions normally above blank positions so far as calibration of the face of recessed portion 19 of dial 14 are concerned. One of these open positions, as will be explained hereinafter, is provided for the purpose of impulsing the digit or associated character for the impulse position 1 of the dial 14. The other two open positions are intended for expansion of the system by the addition of a further exchange letter and/or the addition of inter-city dialing.

The exterior of the tubular unidirectionally rotatable shaft 25 is screw threaded as represented at *25c* adjacent the end *25b* thereof. The main gear 29 is secured over the tubular unidirectionally rotatable shaft 25 by means of nut 30 engaging screw threads *25c* and lock nut 31 engaged over screw threads *25c* firmly maintaining main gear 29 in position to be driven by the tubular unidirectionally rotatable shaft 25 as the tip *25a* of the shaft involves in the aperture *22a* in bracket 22.

The main gear 29 meshes with a pinion 32 having cylindrical hub *32a* which is concentrically mounted on stub shaft 33, as shown more particularly in Figs. 9 and 10, and is free for relative movement with respect to stub shaft 33 through limited angular increments. The stub shaft 33 is mounted in bearings provided by the top casing 16 at one end and the bracket 22 at the other end. The stub shaft 33 carries the circular plate 34 terminating in cylindrical hub 35 which fits over the shaft 33. A friction clutch spring member 36, operative to resist rotation of shaft 33 in one direction but allow rotation of shaft 33 in the other direction, fits over and embraces the cylindrical hub 35 of circular plate 34 and also embraces the cylindrical hub *32a* contiguous with pinion 32. The friction clutch spring member 36 consists of a coil spring having closely wound convolutions with the convolutions at one end of the coil spring establishing frictional connection with the cylindrical hub *32a* immediately adjacent pinion 32 and the convolutions at the other end of the coil spring establishing frictional connection with the cylindrical hub 35 at a position immediately adjacent the circular plate 34. The coil spring becomes a unidirectional force-transmitting medium in one direction but serves as a slip clutch in the other direction. In other words, motion transmitted by main gear 29 through pinion 32 is effective to revolve plate 34 in only one direction as the friction clutch 36 torsionally binds against movement in the opposite direction. The circular plate 34 carries the fiber gear 37 having the teeth thereof shaped to engage the teeth of the worm 38 which are formed on the shaft 39 which is arranged to be both translatory and rotatably movable. The fiber gear 37 abuts against the slotted flange shown at 40 which is integral with the stub shaft 33. The slotted flange 40 serves as a ratchet which is engaged by the spiral yieldable pawl 41 which is carried by the plate *42b* to which is attached the disc of insulation material shown at 42. The disc of insulation material 42 is radially slotted as represented at *42a*, the slots having a sufficient width to enable the projecting ends 43 of a set of contact leaf springs shown at *43a* to be opened and closed as the arms of the disc pass between the projecting ends 43. That is to say, the disc 42 may have a single arm of insulation material thereon, or may have two or three arms which are spaced from each other providing a gap therebetween. In the form of my invention shown, the disc 42 is provided with three arms disposed in 120° relation, the separation between the arms as shown at 42*a* being of such width that the projecting ends 43 of the leaf springs 43*a* move toward each other as represented in Fig. 11, enabling contactors 44 and 45 carried by the inner faces of leaf springs 43*a* to be closed. When, however, the radially extending arms pass between the projecting ends 43 of the leaf springs 43*a*, the contactors 44 and 45 are separated as illustrated in Fig. 12.

The disc 42 of insulation material also carries a spiral spring pawl 46 on its face opposite the plate 42*b* and the attached spiral yieldable pawl 41. The spiral spring pawl 46 has the terminating end thereof formed into a detent adapted to engage in step-to-step relation the spaced apertures 22*b* formed in bracket 22 as illustrated more clearly in Figs. 3, 5, 7 and 8. The spiral yieldable pawl 41 and spiral spring pawl 46 are both resilient and project away from the side of plate 42*b* and the side of disc 42, the terminus end of spring pawl 41 engaging the spaces between slotted flange 40 as a detent, while the detent end of spiral spring pawl 46 engages the apertures 22*b* in bracket 22, thereby enabling the entire shaft assembly on shaft 33 to move unidirectionally with accuracy and precision for controlling the impulsing circuit torsion contactors 44 and 45.

The leaf springs 43*a* are part of a spring pile-up assembly designated at 47 supported on the extension arm 22*c* of the bracket 22 and consisting of a stack of spacer plates of insulation material serving to positively space the several leaf springs shown at 48, 49, 50 and the aforesaid set of leaf springs shown at 43*a*. The leaf springs 48, 49 and 50 are turned at an angle and extend in planes substantially normal to the longitudinal axis of the bracket 22 as shown more particularly in Fig. 3. The leaf spring 49, which extends intermediate the leaf springs 48 and 50 and projects beyond the aforesaid leaf springs, is biased toward the end foot 23 of the bracket 22 and carries aligned electrical contacts 51 and 52 on opposite sides thereof and a block of insulation material 53 adjacent the terminus end thereof. The leaf springs 48 and 50 carry contactors 54 and 55 aligned with the contacts 51 and 52 respectively as illustrated in Figs. 3, 11 and 12.

The feet 23 and 24 of bracket 22 serve as supports for tubular bearings in which opposite ends of the composite rotatable and translatory shaft 39 may revolve and longitudinally slide. The foot 23 is apertured in general alignment with the longitudinal axis of shaft 39 for the passage of the sleeve bushing 56 of the cylindrical governor guard 57 and is secured with respect to the foot 23 of bracket 22 by means of nut 58 engaging the external screw threads on the sleeve bushing 56. The sleeve bushing 56 has an axial bore 56*a* extending therethrough for receiving the projecting end 39*a* of shaft 39. The projecting end of shaft 39 constituting shoulder 39*b* is cylindrically recessed for receiving and supporting the projecting end 59 of insulation material against which the insulated block 53 is yieldably pressed by the inherent resiliency and bias of leaf spring 49. The opposite end of shaft 39 terminates in a cylindrical terminus 60 which is slidable in sleeve 61 which is secured in the opposite foot 24 of bracket 22 by means of nut 62 which engages external screw threads on the sleeve 61. The shoulders 39*b* and 39*c* adjacent opposite ends of shaft 39 serve as opposite limiting stops restricting the endwise or translatory movement of shaft 39, so that the distance through which leaf spring 49 may be displaced to free the electrical connection between contact 52 and contactor 55 and establish connection between contact 51 and contactor 54 is accurately restricted. The composite translatory and rotatable shaft 39 carries an inertia device supported by sleeve 63 which fits over shaft 39 beyond the worm 38 and carries flexible, resilient arms 64 and 65 each supporting weights 66 and 67, respectively, on the extremities thereof. The centrifugal path through which the weights 66 and 67 may be displaced is limited by abutment of the weights 66 and 67 with the interior wall of cylindrical governing guard 57. Thus, as rotary movement is imparted by fiber gear 37 to worm 38, shaft 39 revolves and the inertia device immediately operates, sustaining the rotary movement of the shaft 39 and the displacement of shaft 39 by axial sliding thereof in sleeve bushing 56 and sleeve 61 from the position illustrated in Fig. 11 to the position shown in Fig. 12. Under these conditions the inherent bias and resilient tendency of leaf spring 49 to maintain the block of insulation material 53 in engagement with the insulated tip 39*a* of shaft 39 is overcome by movement of the shaft 39 to the position shown in Fig. 12, accompanied by the opening of the circuit between contact 52 and contactor 55 and the closing of the circuit between contact 51 and contactor 54 as shown in Fig. 12. This is effected by the tangential driving force imparted to the worm 38 and shaft 39 at the same time that the worm 38 and shaft 39 are rotated. The position of the impulse controlling disc 42 is synchronized with the position of leaf spring 49, so that in the initial start position or condition of a rest, contactors 44 and 45 are closed at the time that contact 52 is biased into connection with contactor 55; whereas subsequent to the initial start condition, the impulsing contactors 44 and 45 are moved to open position as the insulated arms of disc 42 pass between the leaf springs 43*a* for spreading the leaf springs and opening contactors 44 and 45, while contact 51 is moved to a position making connection with contactor 54, while the circuit between contact 52 and contactor 55 is opened. Figs. 11 and 12 make it clear that the pulsing contactors 44 and 45 are connected in parallel with the contactor 55 and the contact 52. The impulsing circuit leading to the central station is represented at 68, whereas the circuit leading to the telephone subscriber circuit is indicated at 69. It will be seen that during the pulsing operation, the telephone subscriber circuit is shunted thereby protecting the telephone from the reproduction of clicks arising from the successive making and breaking of contactors 44 and 45 through various permutations and combinations.

The bias, which is constantly applied by leaf spring 49 on the end of the insulator 39*a* carried by the translatory and rotatable shaft 39, is adequate to maintain shaft 39 with the shoulder 39*c* thereof in abutment with the sleeve 61. This is true independently of the position in which the mechanism may be turned, that is whether vertical or horizontal, although in the vertical position the force of gravity aids in the restriction of shaft 39 to its normal position with shoulder 39*c* in abutment with sleeve 61. In the process of restoring shaft 39 to its initial position, shaft 39 revolves slightly in the sleeve bushing 56 and in sleeve 61 as worm 38 is free to turn within the peripheral teeth of fiber gear 37, even though fiber gear 37 is restrained against movement. Sufficient tolerance is allowed for movement of disc 42 by reason of the spacing provided by the slotting of the disc 42 and the fact that projecting ends 43 of sleeve springs 43*a* occupy an angular space of the order of approximately 60°. Hence, a certain amount of backlash may be permitted in the mechanism. The inertia device constituted by the governor consisting of weights 66 and 67 on arms 64 and 65 is disposed concentrically around the axially extending shaft 39 and controls both the translatory and rotative movement of the shaft.

In Fig. 1, I have shown the stop member 28 as positioned immediately to the left of the first blank finger cut-out in dial 14 to insure the effective dialing of digit and/or associated letter at calibrated position "1" of the dial. In order to simiplify the installation at the subscriber's position, the finger cut-outs not immediately required may be blanked out on the dial by use of the arrangement shown in Figs. 13 and 14. In this arrangement, the stop member is represented at 28′ having an extended cover 28″ extending therefrom and extending entirely over two of the finger cut-outs 15. The stop member is secured as heretofore explained by means of a bracket extension 28*a* which is secured to the front of recessed portion 19 of top casing 16 by attachment screws 24*b* as heretofore described.

I have explained that the rotary shaft assembly 33 includes the unilateral torsion coupling provided by friction clutch spring 36. Where this unilateral torsion coupling is employed, it is not necessary to provide the detent mechanism consisting of the recesses 14*a* in the dial 14 and the coacting spring operated detent 27. That is to say, the spring operated detent 27 and the arrangement of coacting recesses 14*a* aligned with the finger cut-outs 15 of the dial may be used in lieu of the unilateral friction clutch constituted by spring 36, and vice versa.

In the operation of the unidirectionally controlled dial, the movement of the dial is constantly clockwise and no recoil or rewind or reverse dial time is required. The advantages accruing from the use of the dialing system of my invention are many, for in addition to the conservation of subscriber and switchboard operating time with accompanying conservation in power consumption, the reduction in the number of component parts over conventional dials simplifies and reduces maintenance costs. I have found the dialing system of my invention highly practical in construction and operation, and while I have described my invention in one of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. In an automatic telephone system, a unidirectionally rotatable finger actuated dial mechanism movable through selected permutation and combination positions, a pair of impulse-controlling contacts comprising a sequence contactor, means driven by said dial mechanism for selectively controlling the opening and closing of said contacts through a successive series according to selections effected by said finger actuated dial mechanism, a gear driven by said dial mechanism, a shaft extending in a direction substantially tangential to said gear, a worm wheel carried by said shaft and meshing with said gear, means for mounting said shaft for both rotative and translatory movement in an axial direction from an initial limiting position to a displaced limiting position, a leaf spring extending across the path of said shaft normal to the axis thereof and flexed for normally exerting a force against the end of said shaft for biasing said shaft to the initial limiting position thereof, a pair of opposed contacts carried by said leaf spring in a position displaced from the position at which the end of said shaft engages said leaf spring, a pair of aligned contactors co-acting with said contacts, means for mounting one of said pair of opposed contacts for establishing contacting connection with one of the aligned contactors when said shaft is biased to the initial limiting position thereof, means for mounting the other of said opposed contacts for establishing contacting connection with the other of said contactors in the displaced limiting position of said shaft and circuit connections between said pair of impulse controlling contacts, said first mentioned contactor and said leaf spring, whereby said pair of impulse controlling contacts are rendered effective when said shaft is moved lineally to the displaced limiting position thereof and means for obstructing reverse movement of said dial mechanism.

2. A dialing system as set forth in claim 1 in which one of said opposed contacts and said leaf spring being connected in parallel with said sequence contactor, the other of the opposed contacts carried by said leaf spring and the associated aligned contactor operating to electrically isolate said sequence contactor from said impulsing circuit while said shaft is in the initial biased position thereof.

3. A dialing system comprising a unidirectionally rotatable finger-actuated dial mechanism movable through selected permutation and combination positions, a shaft unidirectionally driven by said dial mechanism, a gear driven by said shaft, a shaft member extending substantially tangential to the periphery of said gear, a worm carried by said shaft member and meshing with the teeth on the periphery of said gear, means for mounting said shaft member for both rotatable and linear movement, the said linear movement extending from an initial limiting position to a displaced limiting position, an electrical contact system aligned with one end of said shaft member and insulatingly mounted with respect thereto and movable to either of two positions comprising a leaf spring supported at one end thereof and carrying a body of insulation material adjacent the other end thereof aligned with the terminus of said shaft member, said leaf spring being biased for urging said body of insulation material into contact with the end of said shaft member for normally biasing said shaft member to the initial limiting position thereof, a pair of opposed contacts carried by said leaf spring in a position intermediate the opposite ends of said leaf spring, contactors aligned with said pair of opposed contacts on opposite sides thereof and positioned with respect thereto whereby the contact on one side of said leaf spring establishes connection with the associated contactor when said shaft member is disposed in the initial limiting position thereof and wherein the other of said opposed contacts establishes connection with the other of said contactors when said shaft member is shifted to the displaced limiting position thereof and means interposed between said gear and said shaft for obstructing reverse movement thereof.

4. A direct dialing system comprising a housing, a finger actuated unidirectionally rotatable dialing mechanism including a main gear, a stub shaft journaled in said housing, a pinion freely revolvable on said stub shaft, a longitudinally extending cylindrical hub on said pinion, a coacting cylindrical hub attached to said stub shaft and axially aligned with the aforesaid hub, a gear connected with said last mentioned hub, a shaft extending tangential to said last mentioned gear, a worm carried by said shaft and meshing with said last mentioned gear and driven thereby, an electrical switch actuated by said shaft, an impulsing device operated by said stub shaft, and means interconnecting said coacting hubs for imparting movement to said last mentioned gear from said main gear unidirectionally, said means establishing a binding obstruction in the reverse direction for insuring movement of said impulsing device unidirectionally.

5. A direct dialing system as set forth in claim 4 in which said second mentioned gear is carried by a plate member that is mounted on the hub attached to said stub shaft, and wherein the means interconnecting said hubs extends from said plate member to said pinion.

6. A direct dialing system as set forth in claim 4 in which the means interconnecting the coacting hubs consists of a friction clutch coil spring member having the turns thereof surrounding the surfaces of said cylindrical hubs for transmitting a turning torque from said pinion to said impulsing device in one direction while establishing frictional binding contact with the surfaces of said cylindrical hubs and resisting movement of said stub shaft in the reverse direction.

7. A direct dialing system as set forth in claim 4 in which the coacting hubs are axially aligned and have the adjacent ends thereof slightly spaced and in which said means interconnecting said coacting hubs consists of a coil spring having convolutions at one end thereof establishing frictional connection with said first mentioned hub immediately adjacent said pinion and the convolutions at the other end thereof establishing frictional connection with said coacting hub immediately adjacent said second mentioned gear with the intermediate convolutions thereof free to transmit turning torque to said second mentioned gear in one direction while establishing frictional binding contact with the surfaces of said cylindrical hubs for obstructing movement in the reverse direction.

References Cited in the file of this patent

UNITED STATES PATENTS

| | | |
|---|---|---|
| 1,286,982 | Forsberg | Dec. 10, 1918 |
| 1,523,468 | Woodruff et al. | Jan. 20, 1925 |
| 1,642,822 | Obergfell | Sept. 20, 1927 |
| 2,394,360 | Bosh | Feb. 5, 1946 |
| 2,503,538 | Arthur | Apr. 11, 1950 |

FOREIGN PATENTS

| | | |
|---|---|---|
| 34,119 | Netherlands | June 15, 1934 |
| 301,424 | Great Britain | Sept. 26, 1929 |